(12) United States Patent
Saitoh et al.

(10) Patent No.: US 7,719,413 B2
(45) Date of Patent: May 18, 2010

(54) OCCUPANT DETECTION SYSTEM AND OCCUPANT PROTECTION SYSTEM

(75) Inventors: Yukihiro Saitoh, Chiryu (JP); Hiroyuki Itoh, Chita (JP)

(73) Assignee: Denso Corporation, Kariya (JP)

( * ) Notice: Subject to any disclaimer, the term of this patent is extended or adjusted under 35 U.S.C. 154(b) by 237 days.

(21) Appl. No.: 11/999,459

(22) Filed: Dec. 5, 2007

(65) Prior Publication Data
US 2008/0143508 A1 Jun. 19, 2008

(30) Foreign Application Priority Data
Dec. 15, 2006 (JP) .............................. 2006-339006

(51) Int. Cl.
*B60Q 1/00* (2006.01)

(52) U.S. Cl. ................. 340/457.1; 340/941; 340/686.5; 340/545.2

(58) Field of Classification Search ............. 340/457.1, 340/573.1, 547, 667, 435–436, 438, 545.1, 340/545.2, 430, 551, 941, 933, 686.2, 686.6, 340/686.5
See application file for complete search history.

(56) References Cited

U.S. PATENT DOCUMENTS

| | | | |
|---|---|---|---|
| 5,161,820 A | | 11/1992 | Vollmer |
| 5,711,574 A * | | 1/1998 | Barnes .................. 297/216.11 |
| 5,986,221 A * | | 11/1999 | Stanley ........................ 177/136 |
| 6,317,048 B1 * | | 11/2001 | Bomya et al. ............ 340/573.1 |
| 6,956,465 B2 * | | 10/2005 | Meyer et al. ............. 340/425.5 |
| 7,098,674 B2 * | | 8/2006 | Stanley et al. ................ 324/662 |
| 7,365,549 B2 | | 4/2008 | Karges et al. |
| 2004/0068354 A1 * | | 4/2004 | Tabe ............................ 701/45 |
| 2005/0072249 A1 | | 4/2005 | Maeda et al. |
| 2005/0140210 A1 | | 6/2005 | Kojima et al. |
| 2005/0200466 A1 | | 9/2005 | Amemiya |
| 2007/0285268 A1 * | | 12/2007 | Henze et al. ................. 340/667 |

FOREIGN PATENT DOCUMENTS

| | | |
|---|---|---|
| DE | 101 12 194 | 3/2002 |
| DE | 10 2004 005 298 | 8/2005 |
| DE | 10 2004 025 319 | 12/2005 |
| JP | 05-203512 | 8/1993 |
| JP | 2004-136811 | 5/2004 |
| JP | 2005-233845 | 9/2005 |

OTHER PUBLICATIONS

Office action dated Jul. 14, 2009 in corresponding German Application No. 10 2007 060 000.5.

* cited by examiner

*Primary Examiner*—Daniel Previl
(74) *Attorney, Agent, or Firm*—Harness, Dickey & Pierce, PLC

(57) ABSTRACT

An occupant detection system includes occupant sensors on each of plural seats, first resistors in connection to each of the occupant sensors with different resistance values, a power supply line that supplies electric power to the sensors and resistors from a power source by connecting those parts and the power source, and a control unit that detects occupancy of each of the plural seats based on an electric current value of the power supply line. The occupant detection system having the above configuration detects the occupancy of each of the plural seats without increasing the number of input terminals on the control unit.

9 Claims, 2 Drawing Sheets

OCCUPANT DETECTION SYSTEM AND OCCUPANT PROTECTION SYSTEM

CROSS REFERENCE TO RELATED APPLICATION

This application is based on and claims the benefit of priority of Japanese Patent Application No. 2006-339006 filed on Dec. 15, 2006, the disclosure of which is incorporated herein by reference.

FIELD OF THE DISCLOSURE

The present disclosure generally relates to an occupant detection system and an occupant protection system for use in a vehicle.

BACKGROUND INFORMATION

In recent years, various techniques for detecting an occupant in a seat of a vehicle has been proposed. That is, an occupant detection system is used mainly to detect respective occupants in driver's and passenger's seat in a front row of the vehicle for use with devices such as an air-bag system, a seat belt warning system or the like. However, a requirement for providing the occupant protection system for the occupants in rear seats is on a rise, and that leads to a demand for detecting more occupants in the vehicle. Therefore, a conventional occupant detection system disclosed in, for example, Japanese patent documents JP-A-H10-39045 and JP-A-2005-153556 (latter one is published as US publication document No. 20050140210) and other reference for use in the passenger's seat is also disposed on the rear seat for achieving the goal of rear seat occupant detection.

In this case, a control unit in the occupant protection system detects the occupancy of each of the seats based on occupant sensors disposed on each of the seats. However, according to the configuration of the occupant protection system disclosed in the above documents, input terminals on the control unit for connection to the occupant sensors increases in number.

SUMMARY OF THE DISCLOSURE

In view of the above and other problems, the present disclosure provides a seat occupant detection system that detects each of the occupants in plural seats without increasing the number of input terminals for connection to a control unit in the seat occupant detection system.

(1) Occupant Detection System (1.1) An occupant protection system of the present invention is an occupant detection system for detecting an occupant in each of plural seats. The occupant detection system includes a plurality of seat occupancy sensor switches that are disposed on each of plural seats to detect occupancy of each of the plural seats by being conductive when each of the plural seat is occupied; a plurality of first resistors that have respectively different resistance values in connection to each of the plurality of seat occupancy sensor switches; a power supply line that is connected to the plurality of seat occupancy sensor switches and the plurality of first resistors on one end beside being connected to a power source that supplies electric power on an other end; and a control unit that detects occupancy of each of the plural seats based on an electric current value on the power supply line.

According to the above configuration, the control unit of the system has only one power supply line signal (either of an electric current or an electric voltage) as an input. That is, the control unit has only one input terminal for an input of detection signal. In order to detect which one of the plural seats is occupied, the occupant detection system of the present invention has first resistors with respectively different resistance values in connection (in series or in parallel) to the sensor switches. In this manner, the resistance value of a circuit that is formed by closing/opening one of the plural sensor switches is respectively different, thereby enabling the control unit to distinguish which one of the plural sensor switches is closed when the sensor switches are arranged either in parallel or in series with each other in the circuit. Further, when plural seats are occupied, each of plural occupancy of the plural seats has different circuit resistance value, thereby enabling the control unit to distinguish the difference between different occupancy patterns.

The sensor switches are basically arranged one by one with each of the plural seats. However, the plural sensor switches may be arranged on one long bench sheet. Further, the sensor switch may be disposed on all of the plural seats in the vehicle, or selectively disposed on some of the plural seats in the vehicle.

(1.2) The plural sensor switches are arranged in parallel in the system, and the first resistor may be connected respectively to one of the sensor switches in series. Therefore, the first resistor does not have the electric current supplied thereto when the accompanying sensor switch is open, or the first resistor has the electric current supplied thereto when the accompanying sensor switch is closed.

The above logic explains the following. That is, for example, when none of the plural seats is occupied, the sensor switches are all open and no electric current is provided for the power supply line. This makes it possible for the control unit to determine that none of the plural seats is occupied.

When one of the plural seats is occupied, only one of the sensor switches on the plural seats is closed for providing the electric current that is respectively different from other sensor switches, thereby making it possible for the control unit to determine that which one of the sensor switches is closed and which one of the plural seats is occupied.

When some of the plural seats are occupied, the sum of the electric current, for example, that comes from plural closed switches on the occupied seats has respectively different values due to the respectively different resistance values of each of the first resistors. That is, none of the occupancy patters of the plural seats has the same resistance value, thereby making it possible for the control unit to determine that which of the plural seats are occupied based on the electric current value on the power supply line.

In this manner, the occupant on each of the plural seat can appropriately detected by the occupant detection system of the present invention.

(1.3) Further, the plural sensor switches may be alternatively arranged in series in the system, and the first resistor may be connected respectively to one of the sensor switches in parallel. In this manner, the sensor switch directs electric current to the first resistor connected in parallel when opened, or the sensor switch does not direct the electric current to the first resistor connected in parallel.

Therefore, when none of the plural seats are occupied, for example, the sum of the electric current in the system becomes minimum because all of the electric current is directed to the first resistors due to the open condition of the accompanying switches. That is, the occupancy (i.e., vacancy in this case) of the plural seats is appropriately detected.

When some of the plural seats are occupied, the sum of the electric current in the system becomes respectively different for each of the plural occupancy patterns due to the respectively different resistance values (as described in (1.2) in the above). That is, the occupancy of some of the plural seats is appropriately detected.

When all of the plural seats are occupied, the sum of the electric current in the system becomes maximum because all of the electric current is directed to the sensor switches due to the close condition of all of the switches. That is, the occupancy of all of the plural seats is appropriately detected.

Therefore, the occupancy of the plural seats is, in any of the above cases, appropriately detected.

(2) The Occupant Protection System

The occupant detection system described in the above may be combined with seat belt sensor switches in the vehicles such as an automobile, an air plane or the like for systematically detecting wear of the seat belts as an occupant protection system.

The occupant protection system on the present embodiment includes a plurality of seat occupancy sensor switches that are disposed on each of plural seats to detect occupancy of each of the plural seats by being conductive when each of the plural seats is occupied; a plurality of first resistors that have respectively different resistance values in connection to each of the plurality of seat occupancy sensor switches; a plurality of seat belt sensor switches that are disposed on each of a plurality of seat belts on the plural seats to detect wear of each of the plurality of seat belts by being conductive when each of the plurality of seat belts is worn; a plurality of second resistors that have respectively different resistance values that are being different from each other and from the resistance values of the plurality of first resistors in connection to each of the plurality of seat belt sensor switches; a power supply line that is connected to the plurality of seat occupancy sensor switches, the plurality of first resistors, the plurality of seat belt sensor switches, the plurality of second resistors on one end beside being connected to a power source that supplies electric power on an other end; and a control unit that detects wear of each of the plurality of seat belts on each of the plurality seats that is detected as occupied based on an electric current value on the power supply line.

The occupant protection system of the present invention has its own advantage besides the advantage of the occupant detection system described above. That is, each of the seat belt sensor switches has an accompanying second resistor with respectively different resistance values from each other and from the first resistors, thereby making it possible for the control unit to distinguish wear of the seat belt in each of the occupied seats in the vehicle based on the electric current value from the sensor switches. This is because, according to the logic as previously explained, each of the occupancy patterns and wear patterns of the seat belts has respectively different total resistance values, thereby yielding respectively different electric current value when the occupant detection sensors and seat belt sensors are connected in parallel or in series.

Further, the occupant protection system may have a different configuration. That is, the occupant protection system includes: a plurality of seat occupancy sensor switches that are disposed on each of plural seats in connection in parallel to detect occupancy of each of the plural seats by being conductive when each of the plural seats is occupied; a plurality of first resistors that have respectively different resistance values in connection in series to each of the plurality of seat occupancy sensor switches; a plurality of seat belt sensor switches that are disposed on each of a plurality of seat belts on the plural seats in connection in series to detect wear of each of the plurality of seat belts by being conductive during wear of the seat belt and by being non-conductive during non-wear of the seat belt; a power supply line that is connected to the plurality of seat occupancy sensor switches, the plurality of first resistors, and the plurality of seat belt sensor switches on one end beside being connected to a power source that supplies electric power on an other end; and a control unit that detects wear of each of the plurality of seat belts on each of the plurality seats that is detected as occupied based on an electric current value on the power supply line.

That is, the seat occupancy sensor switch on each of the plural seats is connected in series to the first resistor and the seat belt sensor switch. Thus, each of the series circuits for detecting occupancy and seat belt wear is connected in parallel with each other in the present configuration.

In this case, the series circuit for one seat is picked up for the clarity of explanation. When the seat is not occupied, the seat occupancy sensor switch is not conductive, and thus the series circuit is not conductive. That is, the electric current is not provided for the circuit. Next, when the seat is occupied and the seat belt is worn, the occupant sensor switch is conductive due to the occupancy of the seat. However, the seat belt sensor switch is not conductive due to wear condition of the seat belt sensor switch. That is, the electric current is not supplied to the circuit. Next, when the seat is occupied and the seat belt is not worn, the seat occupancy sensor switch is conductive due to the occupancy of the seat, and the seat belt sensor switch is conductive due to the non-wear condition of the seat belt. Therefore, the series circuit is conductive as a whole. That is, the series circuit has the electric current.

Further, when plural seats are considered, the plural series circuits are connected in parallel, and the first resistor in each of the series circuits has respectively different resistance values. Therefore, the control unit can distinguish which of the plural series circuits in association with the plural seats is conductive. That is, in other words, the control unit can detect which of the plural seats is not in seat belt wear condition in spite of the occupancy of the seat.

The control unit may perform a lighting control or a blinking control of a warning lamp when the seat belt of the occupied seat is not used in the above the occupant protection system.

BRIEF DESCRIPTION OF THE DRAWINGS

Other objects, features and advantages of the present invention will become more apparent from the following detailed description made with reference to the accompanying drawings, in which.

DETAILED DESCRIPTION

Embodiments of the present disclosure are described with reference to the accompanying drawings.

(1) The First Embodiment

An embodiment of the present invention is described in detail in the following. The sitting detection system and the occupant detection system of the present invention are applied to an automotive vehicle.

Figure 1:
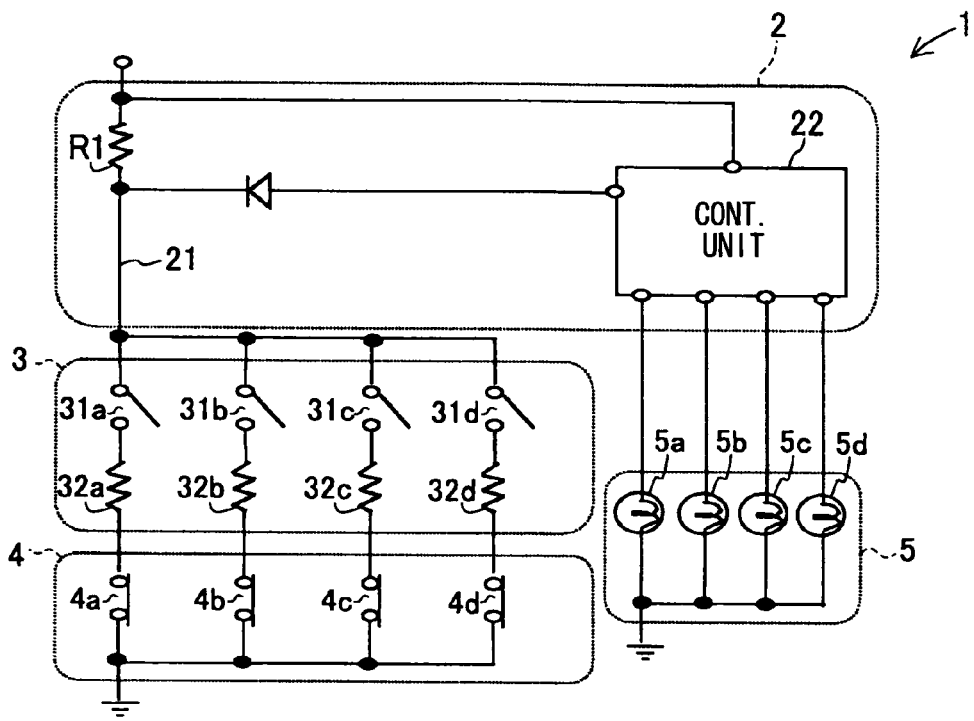
FIG. 1 shows a block diagram of an occupant protection system in an embodiment of the present invention.

FIG. 1 shows a circuit block-diagram of an occupant protection system 1 in the first embodiment of the present invention. As the occupant protection system 1, a seat belt warning system is taken for an example in the present embodiment. The seat belt warning system is a system to turn on and off a seat belt warning lamp when the seat belt of the seat that is occupied by an occupant is not fastened. In other words, it is the system which protects an occupant by providing warning to an occupant with a warning lamp 5 by flashing on and off when the seat belt is not fastened by the occupant of the seat.

In the present embodiment, the vehicle of 5-passenger with two rows of seats in a front and rear is used for describing the example of the system 1. In other words, the system 1 is used to warn the occupant in the passenger seat and/or in a rear left/center/right seats by lighting/blinking the warning lamp 5 for respective seats when the seat is occupied without using the seat belt.

The occupant protection system 1 consists of an electric control unit 2 for meter control, a sitting sensor circuit part 3, a seat belt sensor switch 4 and the warning lamp 5.

The electric control unit 2 for meter control (i.e., a meter ECU 2 hereinafter) is connected to electric power source (a battery in the vehicle) and to the sitting sensor circuit part 3, and further to the warning lamp 5 corresponding to each seat. The meter ECU_2 has a power supply line 21 and a control unit 22.

One end of the power supply line 21 is connected to a power supply, and the line 21 supplies electricity from the power supply, and another end of the power supply line 21 is connected to the sitting sensor circuit part 3 and the seat belt sensor switch 4 sides that are mentioned later. In other words, the power supply line 21 electrically connects the power supply, the sitting sensor circuit part 3 and the seat belt sensor switch 4. Furthermore, on this the power supply line 21, a resistor R1 is connected in series.

The control unit 22 is connected to both ends of the resistor R1 in the power supply line 21. And the control unit 22 detects the voltage between both ends of the resistor R1, and determines whether to light/blink warning lamps 5a-5d that are mentioned later depending on the detected voltage. In other words, the control unit 22 takes a current value of the power supply line 21 as an input, and determines whether to turn on the warning lamps 5a-5d depending on the current value. Then a lighting signal is output for the warning lamps 5a-5d when those lamps are determined to be turned on. Derails of the control unit 22 is mentioned later.

The sitting sensor circuit part 3 consists of sitting sensor switches 31a, 31b, 31c, 31d and of first resistors 32a, 32b, 32c, 32d. The sitting sensor switches 31a-31d are arranged on the surface part of each seat, and the switches 31a-31d are conductive by a load from an occupant when the occupant sits on the seat. As the sitting sensor switches 31a-31d, well-known membrane switches disclosed in Japanese patent document No. 2005-153556 may be used. The sitting sensor switches 31a, 31b, 31c, 31d are respectively disposed on the passenger seat, rear left seat, rear right seat, and rear central seat in this order. In other words, the sitting sensor switches 31a-31d respectively detect occupancy of the passenger seat, rear left seat, rear right seat, and rear center seat sequentially. And the sitting sensor switches 31a-31d are connected in parallel, and one end of each of the switches 31a to 31d is connected to an opposite side of power supply side of the resistor R1 on the power supply line 21.

The first resistors 32a-32d are in series connection to the sitting sensor switches 31a-31d respectively. In other words, one end of first resistors 32a-32d is connected to another end of the sitting sensor switches 31a-31d in a corresponding manner. And the resistance value of the first resistors 32a-32d are respectively different from each other. More practically, the resistance values of the first resistors 32a-32d are, for example, 1Ω, 2Ω, 4Ω and 8Ω respectively.

As for the seat belt sensor switch 4, there are four of them. That is, the sensor switch 4 includes the seat belt sensor switch 4a for the passenger seat, the seat belt sensor switch 4b for the rear left seat, the seat belt sensor switch 4c for the rear right seat, and the seat belt sensor switch 4d for the rear center seat. These seat belt sensor switches 4a-4d are disposed in the buckle part of the seat belt of each seat. When the seat belt is not fastened by an occupant in the seat, the seat belt sensor switches 4a-4d are conductive, and when the seat belt is not fastened by the occupant, the switches 4a-4d are non-conductive.

One ends of the seat belt sensor switches 4a-4d are respectively connected to another ends of the first resistors 32a-32d, and another ends of the seat belt sensor switches 4a-4d are connected to the ground. In other words, the seat belt sensor switches 4a-4d are in series connection to the sitting sensor switches 31a-31d.

The warning lamp 5 is arranged in the meter part of the installment panel of the vehicle. As for the warning lamp 5, a warning lamp 5a corresponding to the passenger seat, a warning lamp 5b corresponding to the rear left seat, a warning lamp 5c corresponding to the rear right seat and a warning lamp 5d corresponding to the rear center seat are included. These lamps 5a-5d are in connection to the control unit 22, and these warning lamps 5a-5d are lit or controlled in a similar manner when a lighting signal is output from the control unit 22.

Detailed operation of the control unit 22 stated above is described in the following in association with the operation of the sitting sensor switches 31a-31d and the seat belt sensor switches 4a-4d.

At first the operation regarding the passenger seat is described. When an occupant is not sitting in the passenger seat, the sitting sensor switch 31a is not conductive. Therefore, the series circuit (the sitting sensor switch 31a, the first resistor 32a and the seat belt sensor switch 4a) related to the passenger seat is not conductive as a whole. Next, when an occupant is sitting in the passenger seat and a seat belt is fastened, the sitting sensor switch 31a is conductive but the seat belt sensor switch 4a is not conductive. Therefore, as a whole, the series circuit related to the passenger seat is not conductive. Next, when an occupant is sitting in the passenger seat and the seat belt is not fastened, the sitting sensor switch 31a and the seat belt sensor switch 4a are conductive altogether. Therefore, as a whole, the series circuit related to the passenger seat is conductive. The series circuits for other seats operate in the same manner.

Then, for example, an electric current does not flow to the power supply line 21 when all seats are occupied or when all occupants are sitting in a condition of fastening the seat belt. Therefore, in this case, the control unit 22 does not output a lighting signal to any of the warning lamps 5a-5d.

When only an occupant in the passenger seat does not fasten the seat belt, an electric current is passed only to the series circuit related to the passenger seat. In this case, an electric current corresponding to first resistor 32a flows through the power supply line 21. In addition, when only an occupant in the rear left seat does not fasten the seat belt, an electric current flows only to the series circuit related to the rear left seat. In this case, an electric current corresponding to the first resistor 32b flows through the power supply line 21. In addition, the electric current is similarly provided for the circuits of the other seats.

Furthermore, an electric current flows only to the series circuit related to the passenger seat and the rear left seat when occupants in the passenger seat and the rear left seat do not fasten the seat belts. More practically, the first resistors 32a, 32b form a parallel circuit. In this case, the electric current corresponding to the first resistors 32a, 32b flows through the power supply line 21.

And the first resistors 32a-32d has respectively different resistance values. Therefore, the electric current supplied to the power supply line 21 is different depending on the seat whose occupant is not fastening the seat belt. In other words, the control unit 22 can determine, based on the electric current value flowing through the power supply line 21, in which seat the occupant is not fastening the seat belt. And the control unit 22 outputs a lighting signal to the warning lamps 5a-5d corresponding to the seat with the un-fastened seat belt for turning on and off the lamps 5a-5d.

As described above, the control unit 22 can determine whether occupants in respective seats are fastening the seat belts. Further, the control unit 22 can turn on the warning lamps 5a-5d for the seat with the un-fastened seat belt. Furthermore, the control unit 22 is connected to the sitting sensor switches 31a-31d at one place. In other words, an increase of an input terminal on the control unit 22 to determine whether an occupant in each of the plural seats fastens the seat belt is not required.

(2) The Second Embodiment

Figure 2:
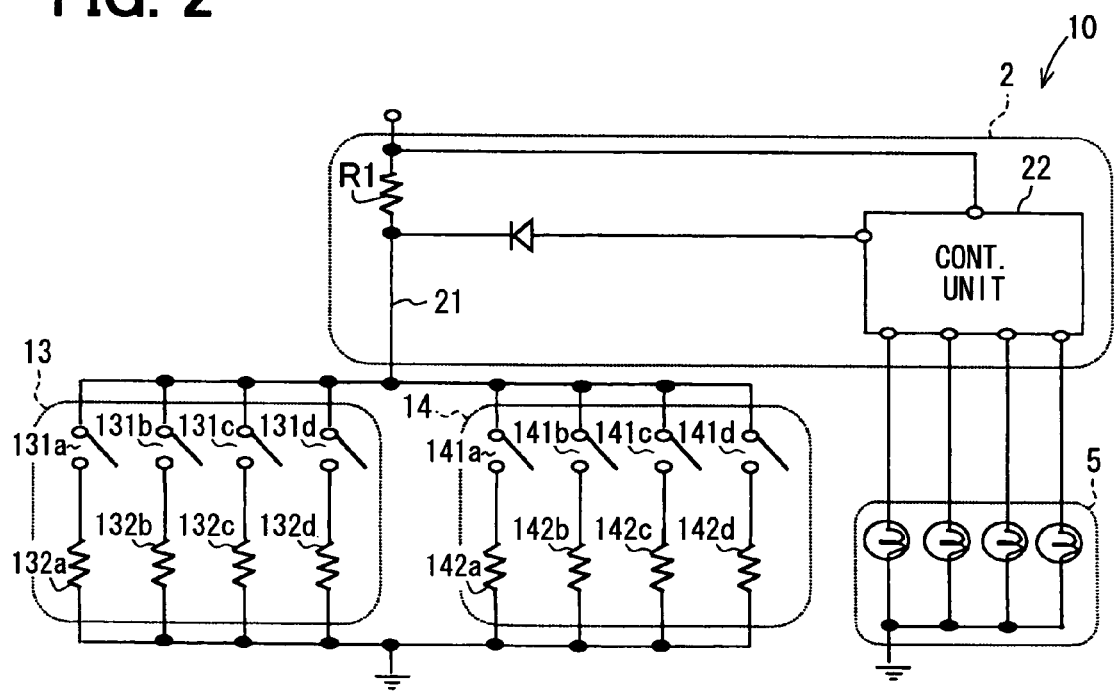
FIG. 2 shows a block diagram of an occupant protection system in another embodiment of the present invention.

The occupant protection system 10 in the second embodiment is described with reference to FIG. 2 in the following. FIG. 2 shows a circuit block-diagram of the occupant protection system 10 in the second embodiment. Like parts have like numbers in the description of the second embodiment, and the same part of the configuration is omitted from the description.

The occupant protection system 10 includes the meter ECU 2, the sitting sensor circuit part 13, a seat belt sensor circuit part 14 and the warning lamp 5. In other words, the occupant protection system 10 of the present embodiment differs from the occupant protection system 1 of the first embodiment at the sitting sensor circuit part 13 and the seat belt sensor circuit part 14.

The sitting sensor circuit part 13 consists of sitting sensor switches 131a, 131b, 131c, 131d and first resistors 132a, 132b, 132c, 132d.

The sitting sensor switches 131a-131d are arranged on the surface part of each seat, and the switches 131a-131d are conductive by a load from an occupant when the occupant sits on the seat. The sitting sensor switches 131a, 131b, 131c, 131d are respectively disposed on the passenger seat, rear left seat, rear right seat, and rear central seat in this order. And the sitting sensor switches 131a-131d are connected in parallel, and one end of each of the switches 131a-131d is connected to an opposite side of power supply side of the resistor R1 on the power supply line 21.

The first resistors 132a-132d are in series connection to the sitting sensor switches 131a-131d respectively. In other words, one end of first resistors 132a-132d is connected to another end of the sitting sensor switches 131a-131d in a corresponding manner. Further, the other ends of the first resistors 132a-132d are connected to the ground. And the resistance value of the first resistors 132a-132d are respectively different from each other. More practically, the resistance values of the first resistors 132a-132d are, for example, 1Ω, 2Ω, 4Ω and 8Ω respectively.

The seat belt sensor circuit part 14 consists of seat belt sensor switches 141a, 141b, 141c, 141d and the second resistors 142a, 142b, 142c, 142d.

The seat belt sensor switches 141a-141d are disposed in the passenger seat, the rear left seat, the rear right seat, and the rear central seat at the buckle part. When a seat belt is fastened, the seat belt sensor switches 141a-141d become conductive. The seat belt sensor switches 141a-141d are connected in parallel, and one ends of the switches 141a-141d are connected to an opposite side of power supply side of the resistor R1 on the power supply line 21. Furthermore, the seat belt sensor switches 141a-141d are also in parallel connection to the sitting sensor switches 131a-131d.

The second resistors 142a-142d are in series connection to corresponding seat belt sensor switches 141a-141d. In other words, the seat belt sensor switches 141a-141d have one ends connected to other ends of the second resistors 142a-142d. Furthermore, other ends of the second resistors 142a-142d are connected to the ground. And each of the resistance values of the second resistors 142a-142d is different from each other and is different from each of the resistance values of the first resistors 132a-132d. More practically, the resistance values of the second resistors 142a-142d are 100Ω, 200Ω, 400Ω, and 800Ω respectively.

In the occupant protection system 10 of the present embodiment, the current value flowing through the power supply line 21 is described in connection to the operation of the sitting sensor switches 131a-131d and the operation of the seat belt sensor switches 141a-141d.

First, the sitting sensor switches 131a-131d and the seat belt sensor switches 141a-141d are all in non-conductive condition when an occupant is not sitting in any of the seats. Therefore, the electric current does not flow through the power supply line 21.

Next, when occupants are sitting in the passenger seat and in the rear left seat and only the occupant sitting in the passenger seat fastens the seat belt, the sitting sensor switches 131a, 131b and the seat belt sensor switch 141a become conductive. Therefore, the electric current passes through the series circuit of the passenger seat and the rear left seat as well as the series circuit of the seat belt of the passenger seat. More practically, the first resistors 132a, 132b and the second resistor 142a form a parallel circuit. In this case, an electric current corresponding to the first resistors 132a, 132b and the second resistor 142a flows through the power supply line 21.

In addition, all sitting sensor switches 131a-131d and all seat belt sensor switches 141a-141d become conductive when all seats are occupied and all occupants fasten seat belts. Therefore, this case, the first resistors 132a-132d and the second resistors 142a-142d form a parallel circuit. Therefore, an electric current corresponding to all of the first resistors 132a-132d and the second resistors 142a-142d flows through the power supply line 21.

Further, the first resistors 132a-132d and the second resistors 142a-142d have respectively different resistance values. Therefore, the electric current flowing through the power supply line 21 takes different values depending on the occupied seats and the seat belt fasten condition of the seat. In other words, based on the current value flowing through the power supply line 21, the control unit 22 can determine which seat is occupied and which occupant in the seat fastens the seat belt. Furthermore, the control unit 22 outputs a lighting signal for lighting/blinking the lamp to any of the warning lamps 5a-5d corresponding to the seat where an occupant does not fasten the seat belt.

(3) The Third Embodiment

The occupant protection system 20 in the third embodiment is described with reference to FIG. 3.

Figure 3:
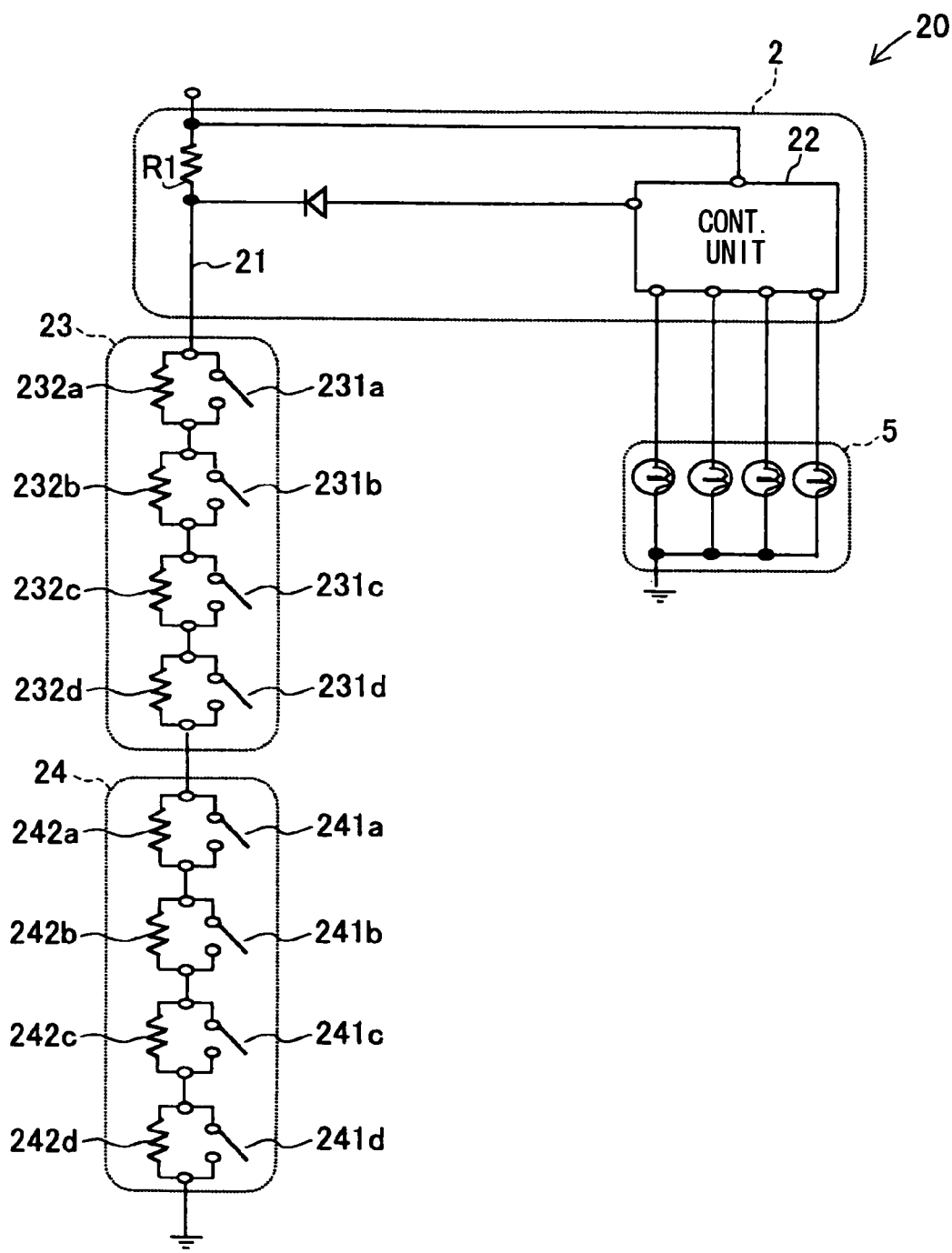
FIG. 3 shows a block diagram of an occupant protection system in yet another embodiment of the present invention.

FIG. 3 shows a circuit block-diagram of the occupant protection system 20. Like parts have like numbers in the description of the third embodiment, and the same part of the configuration is omitted from the description.

The occupant protection system 20 consists of the meter ECU 2, a sitting sensor circuit part 23, a seat belt sensor circuit part 24 and the warning lamp 5. In other words, the occupant protection system 20 in the third embodiment is different from the occupant protection system 1 in the first embodiment at the sitting sensor circuit part 23 and the seat belt sensor circuit part 24.

The sitting sensor circuit part 23 consists of sitting sensor switches 231a, 231b, 231c, 231d and first resistors 232a, 232b, 232c, 232d.

The sitting sensor switches 231a-231d are arranged on the surface part of each seat, and the switches 231a-231d are conductive by a load from an occupant when the occupant sits on the seat. The sitting sensor switches 231a, 231b, 231c, 231d are disposed in the passenger seat, the rear left seat, the rear right seat, the rear central seat in this order. And the sitting sensor switches 231a-231d are in series connection. More practically, one end of the switch 231a is connected to an opposite side of power supply side of the resistor R1 on the power supply line 21, and the sitting sensor switches 231b-231d are connected in this order to the other end of the sitting sensor switch 231a.

The first resistors 232a-232d are respectively in parallel connection to the sitting sensor switches 231a-231d. In other words, both ends of the first resistor 232a are connected to both ends of the sitting sensor switch 231a. Further, both ends of first resistors 232b-232d are also respectively connected to both ends of the sitting sensor switches 231b-231d in the same manner. The resistance values of the first resistors 232a-232d are different from each other. More practically, the resistance value of the first resistors 232a-232d are, for example, 1Ω, 2Ω, 4Ω and 8Ω respectively.

The seat belt sensor circuit part 24 consists of the seat belt sensor switches 241a, 241b, 241c, 241d and the second resistors 242a, 242b, 242c, 242d.

The seat belt sensor switches 241a-241d are disposed in the passenger seat, the rear left seat, the rear right seat, the rear central seat at the buckle part. When a seat belt is fastened, the seat belt sensor switches 241a-241d become conductive, and when the seat belt is not fastened, the seat belt sensor switches 241a-241d do not become conductive. The seat belt sensor switches 241a-241d are in series connection. More practically, one end of the seat belt sensor switch 241a is connected to the other end of the sitting sensor switch 231d, and the seat belt sensor switches 241b-241d are sequentially in series connection to the other end side of the seat belt sensor switch 241a. Further, the other end of the seat belt sensor switch 241d is connected to the ground.

The second resistors 242a-242d are in parallel connection to the seat belt sensor switches 241a-241d. In other words, both ends of the second resistor 242a are connected to both ends of the seat belt sensor switch 241a. Both ends of the second resistors 242b-242d are also connected to both ends of the seat belt sensor switches 241b-241d in the same manner. The resistance values of the first resistors 242a-242d are different from each other. More practically, the resistance value of the first resistors 242a-242d are, for example, 100Ω, 200Ω, 400Ω and 800Ω respectively.

In the occupant protection system 20 of the third embodiment, the current value flowing through the power supply line 21 is described in connection to the operation of the sitting sensor switches 231a-231d and the operation of seat belt sensor switches 241a-241d.

First, the sitting sensor switches 231a-231d and the seat belt sensor switches 241a-241d are all in non-conductive condition when an occupant is not sitting in any of the seats. Therefore, in this case, between an end of the resistor R1 that is opposite to the power source on the power supply line 21 and the ground, all of the first resistors 232a-232d and the second resistors 242a-242d are connected in series. In other words, all of the first resistors 232a-232d and the second resistors 242a-242d are connected in series to form a series circuit. Therefore, an electric current corresponding to all of the first resistors 232a-232d and the second resistors 242a-242d flows through the power supply line 21.

Next, when occupants are sitting in the passenger seat and the rear left seat and only the occupant sitting in the passenger seat fastens the seat belt, the sitting sensor switches 231a, 231b and seat belt sensor switch 241a become conductive. Therefore, the first resistors 232c, 232d and the second resistors 242b, 242c, 242d are connected in series between the end of the resistor R1 on the opposite side to the power source side on the power supply line 21 and the ground. In other words, the first resistors 232c, 232d and the second resistors 242b, 242c, 242d are connected in series to form a series circuit. Therefore, the electric current corresponding to the first resistors 232c, 232d and the second resistors 242b, 242c, 242d flows through the power supply line 21.

In addition, all of the sitting sensor switches 231a-231d and the seat belt sensor switches 241a-241d become conductive when occupants are sitting in all of the seats with the seat belt fastened. Therefore, in this case, the first resistors 232a-232d and the second resistors 242a-242d do not interpose between the end of the resistor R1 opposite to the power source side on the power supply line 21 and the ground. In other words, the end opposite to the power supply side of the resistor R1 on the power supply line 21 is substantially in a directly connected condition to the ground. Therefore, the electric current on the power supply line 21 has no relation relative to all of the first resistors 232a-232d and the second resistors 242a-242d.

Further, the first resistors 232a-232d and the second resistors 242a-242d have respectively different resistance values. Therefore, the electric current on the power supply line 21 is different depending on the occupied seats and the seat belt fasten condition of the seat. In other words, based on the current value flowing through the power supply line 21, the control unit 22 can determine which seat is occupied and which occupant in the seat fastens the seat belt. Furthermore, the control unit 22 outputs a lighting signal for lighting/blinking the lamp to any of the warning lamps 5a-5d corresponding to the seat where an occupant does not fasten the seat belt.

(4) Other Embodiments

Although the present invention has been fully described in connection with the preferred embodiment thereof with reference to the accompanying drawings, it is to be noted that various changes and modifications will become apparent to those skilled in the art.

In the above embodiment, the occupant protection system includes the seat belt sensor switches besides the sitting sensor switches because the system is introduced as a seat belt warning system. However, if it detects only occupancy of the seat, the system only requires the sitting sensor switches. In other words, the occupant protection system may serve as an occupancy detection system.

In addition, the present invention can apply to an occupant protection device starter system to perform the start-up control of the occupant protection devices such as air bags or the like beside the seat belt warning system stated above. For example, the occupant protection device starter system is a system starting the occupant protection devices such as air bags when an occupant is sitting in the seat and the seat belt is fastened.

Further, in the above embodiments, the occupant protection system is applied to the vehicle of 5-passenger with two rows of seats in a front and back side of the vehicle. However, the protection system may be applied to the vehicle with three rows of seats or more seats. In this case, the warning lamp may be disposed to each of those seats.

Furthermore, the position of the seats with the occupancy detection may arbitrarily changed depending on the requirement.

Furthermore, the present invention may be applied to the occupant protection system in various vehicles such as an airplane, a train or the like. In those cases, the occupant protection system may also serve as the occupancy detection system for various purposes.

Such changes and modifications are to be understood as being within the scope of the present invention as defined by the appended claims.

What is claimed is:

1. A seat occupant detection system comprising:
a plurality of seat occupancy sensor switches disposed on each of plural seats to detect occupancy of each of the plural seats by being conductive when each of the plural seats is occupied;
a plurality of first resistors that have respectively different resistance values in connection to each of the plurality of seat occupancy sensor switches;
a power supply line connected to the plurality of seat occupancy sensor switches and the plurality of first resistors on one end beside being connected to a power source that supplies electric power on an other end; and
a control unit that detects occupancy of each of the plural seats based on an electric current value on the power supply line, the power supply line connected to the control unit by one input terminal.

2. The seat occupant detection system of claim 1,
wherein the plurality of seat occupancy sensor switches are connected in parallel, and
each of the plurality of first resistors is connected in series in a corresponding manner to one of the plurality of seat occupancy sensor switches.

3. The seat occupant detection system of claim 1,
wherein the plurality of seat occupancy sensor switches are connected in series, and
each of the plurality of first resistors is connected in parallel in a corresponding manner to one of the plurality of seat occupancy sensor switches.

4. An occupant protection system comprising:
a plurality of seat occupancy sensor switches disposed on each of plural seats to detect occupancy of each of the plural seats by being conductive when each of the plural seats is occupied;
a plurality of first resistors that have respectively different resistance values in connection to each of the plurality of seat occupancy sensor switches;
a plurality of seat belt sensor switches disposed on each of a plurality of seat belts on the plural seats to detect wear of each of the plurality of seat belts by being conductive when each of the plurality of seat belts is worn;
a plurality of second resistors that have respectively different resistance values from each other and from the resistance values of the plurality of first resistors in connection to each of the plurality of seat belt sensor switches;
a power supply line connected to the plurality of seat occupancy sensor switches, the plurality of first resistors, the plurality of seat belt sensor switches, the plurality of second resistors on one end beside being connected to a power source that supplies electric power on an other end; and
each of the plurality of seat belt sensor switches is connected in series with each other and is connected in series to each of the plurality of seat occupancy sensor switches, and
each of the plurality of second resistors is connected in a corresponding manner in parallel with each of the seat belt sensor switches.

5. The occupant protection system of claim 4,
wherein the plurality of the seat occupancy sensor switches are connected in parallel,
each of the plurality of first resistors is connected in series in a corresponding manner to each of the plurality of seat occupancy sensor switches,
each of the plurality of seat belt sensor switches is connected in parallel with each other and is connected in parallel to each of the plurality of seat occupancy sensor switches, and
each of the plurality of second resistors is connected in a corresponding manner in series to each of the seat belt sensor switches.

6. The occupant protection system of claim 4,
wherein the plurality of the seat occupancy sensor switches are connected in series,
each of the plurality of first resistors is connected in parallel in a corresponding manner to each of the plurality of seat occupancy sensor switches, value on the power supply line, the cower supply line connected to the control unit by one input terminal.

7. The occupant protection system of claim 4,
wherein, when each of the plurality of seat belts on the plural seats is not worn, the control unit performs one of a lighting control and a blinking control of a seat belt warning lamp.

8. An occupant protection system comprising:
a plurality of seat occupancy sensor switches disposed on each of plural seats in connection in parallel to detect occupancy of each of the plural seats by being conductive when each of the plural seats is occupied;
a plurality of first resistors that have respectively different resistance values in connection in series to each of the plurality of seat occupancy sensor switches;
a plurality of seat belt sensor switches disposed on each of a plurality of seat belts on the plural seats in connection in series to detect wear of each of the plurality of seat belts by being conductive during wear of the seat belt and by being non-conductive during non-wear of the seat belt;
a power supply line connected to the plurality of seat occupancy sensor switches, the plurality of first resistors, and the plurality of seat belt sensor switches on one end beside being connected to a power source that supplies electric power on an other end; and
a control unit that detects wear of each of the plurality of seat belts on each of the plurality seats detected as occupied based on an electric current a control unit having an input terminal, the control unit detecting wear of each of the plurality of seat belts on each of the plurality seats detected as occupied based on an electric current value on the power supply line, the power supply line connected to the control unit by the input terminal.

9. The occupant protection system of claim 8, wherein, when each of the plurality of seat belts on the plural seats is not worn, the control unit performs one of a lighting control and a blinking control of a seat belt warning lamp.

\* \* \* \* \*